April 28, 1964     L. D. JOHNSON ETAL     3,131,340
PROPORTIONAL PULSE SERVO SYSTEM
Filed Feb. 19, 1962                                             2 Sheets-Sheet 1
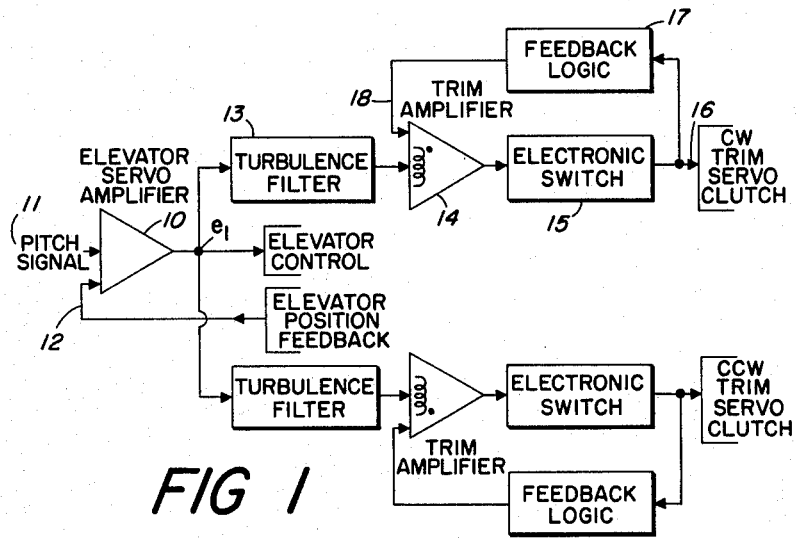
FIG 1
FIG 2
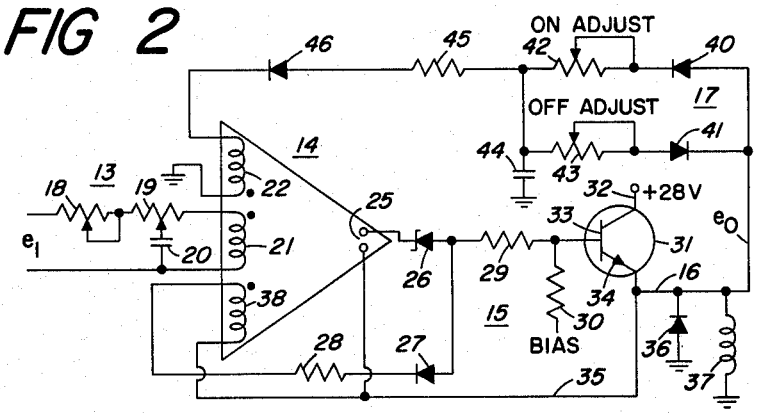
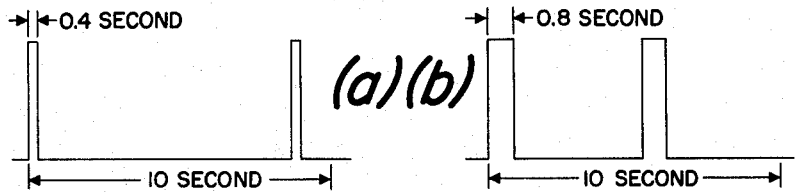
FIG 3
INVENTORS
LLOYD D. JOHNSON
RICHARD L. KITTRELL
DON E. MEIER
BY
Moody & Anderson
AGENTS

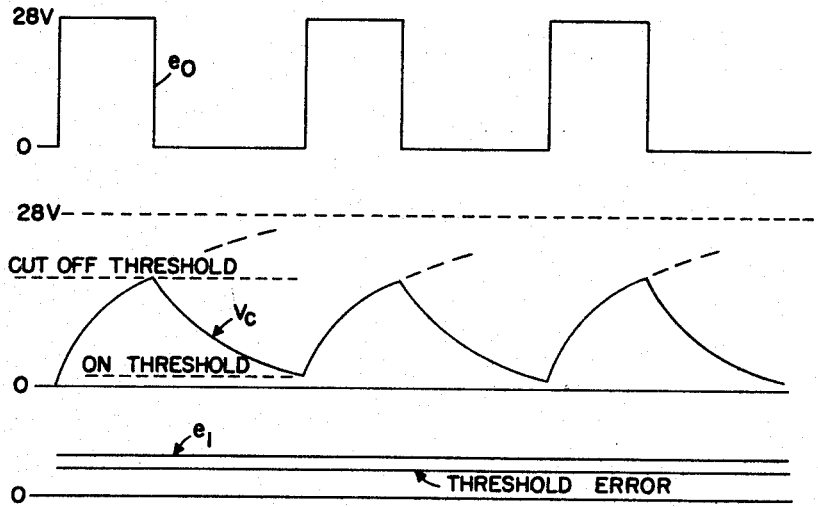
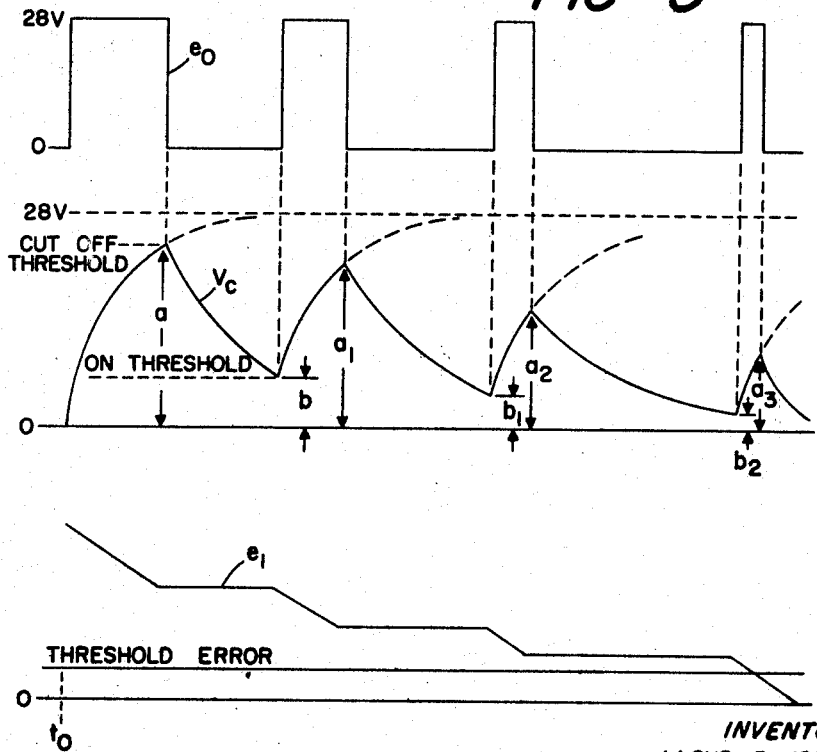

United States Patent Office 3,131,340
Patented Apr. 28, 1964

3,131,340
PROPORTIONAL PULSE SERVO SYSTEM
Lloyd D. Johnson, Richard L. Kittrell, and Don E. Meier, Cedar Rapids, Iowa, assignors to Collins Radio Company, Cedar Rapids, Iowa, a corporation of Iowa
Filed Feb. 19, 1962, Ser. No. 174,016
8 Claims. (Cl. 318—28)

This invention relates generally to servo positioning and more particularly to a servo control arrangement employing a proportional pulsed positioning technique.

The present invention is applicable in servo positioning systems wherein a controlled member is driven from a prime mover through a controllable clutch. The prime mover rotates at a constant speed and the positioning of the controlled member is effected by opening and closing the clutching means in a time controlled manner. This general type of control circuitry is known in the art and finds application where it is desirable or imperative that a maximum torque effort be applied to the control member. Often times the controlled member represents a considerable inertia and precise control necessitates a clutching control in conjunction with a continuously operating prime mover. Since, in these systems, maximum torque is applied to the control member when the clutching mechanism is engaged, means must be incorporated to assure that the controlled member is not positioned beyond its commanded position so as to prevent an oscillatory condition similar to that encountered in conventional servo ssytems with position follow-up feedback wherein a proportional control is attained by presenting the prime mover with an energizing voltage, the magnitude of which is proportional to the extent of deviation of the controlled member with respect to a commanded position.

In a particular embodiment utilizing the present invention to be described herein, a proportional control feature is incorporated by which, in response to an input servo error, the clutch is sequentially closed in response to control pulses whose duration diminishes with decreased error signal and the time interval between successive pulses sequentially increases with decreased error signal. This technique provides a pulsed clutching servo control with proportionality and the duty cycle of the clutching operation is controlled in a proportional manner by successively applying narrower pulse durations with increased separation between pulses as the successive clutching engagements position the controlled member for step-reduction of the servo error voltage.

Known-pulsed clutching techniques employ a fixed rate pulsing device in conjunction with a servo amplifier which selects and gates these pulses so that they either reach the clutch or fail to reach the clutch as a function of the servo error voltage. The pulse rate is generally set to obtain a suitable average duty cycle for clutch engagement. In this type of system, a compromise is inherently incorporated for a particular servo system such that the optimum clutch duty cycle results in a desired control rate, yet prevents overshoot of the positioning control with resulting oscillation of the servo system as the error signal is diminished.

The present invention is an improvement in pulsed servo control systems by which successive application of extremely high prime mover torque may be made to a controlled member and an exacting proportional control be effected.

It is an object therefore of the present invention to provide a proportional servo controlled system which causes a rapid rise of clutch control voltage once the servo error signal reaches a threshold level and which reduces the clutch voltage rapidly to zero upon the servo error signal being reduced beneath a threshold level.

A further object of the present invention is the provision of a novel clutch coupler circuit in a servo system which produces, in response to a servo error signal, an output signal to effect engagement of a magnetic clutch in the form of an output pulse or pulses, the duration and time rate of occurrence of which are each proportioned to cumulatively reduce the clutching duty cycle as a direct function of the magnitude of the servo error signal.

The present invention is featured in the provision of a pulse forming circuit, including an amplifier in conjunction with feedback logic, by which the error input signal and a negative feedback signal are differentially combined in a time controlled manner.

A further feature of the present invention is the provision in a pulsed clutch servo system of means whereby a well defined time interval follows each clutch engaged period so that clutch chatter cannot occur.

Still a further feature of the present invention is the provision of developing a train of control pulses in response to the magnitude of an input signal in which a maximum pulse width and minimum delay time between successive pulses may be selectively chosen for any predetermined static input level and in which the durations of successive pulses and intervals therebetween are respectively decreased and increased with decreasing error input level.

These and other features and objects of the present invention will become apparent upon reading the following description in conjunction with the accompanying drawings in which:

FIGURE 1 illustrates the embodiment of the present invention in a trim control circuit for an automatic pilot.

FIGURE 2 is a schematic representation of the clutch coupler arrangements utilized in the embodiments of FIGURE 1, in accordance with the present invention;

FIGURE 3 represents output wave forms of the circuitry of FIGURE 2 to illustrate operational aspects of the present invention;

FIGURE 4 is a diagrammatic representation of waveforms related to FIGURE 2 in response to a static error input signal to the circuitry of FIGURE 2 and corresponding to open loop operation of the embodiment of FIGURE 1; and FIGURE 5 represents operational waveforms of the circuitry of FIGURE 2 in response to closed loop operation of the embodiment of FIGURE 1, wherein the error signal input is successively decreased with the application of output pulses to the clutch.

The present invention may be utilized to effect proportional trim control in an autopilot system and will hereinafter be described with respect to its incorporation in such an embodiment. It is to be understood, however, that the invention is generally applicable as a means of obtaining proportional control in a pulsed servo system, and is not limited to the autopilot trim control embodiment.

The application of the present invention in a trim control embodiment is illustrated functionally in FIGURE 1 wherein a pitch command signal 11 as conventionally developed in autopilot circuitry, is applied to an elevator servo amplifier 10 to produce an output voltage $e_1$ which is applied to control the position of the elevator control surface. Positional elevator feedback is applied as a second input 12 to the servo amplifier 10 in a conventional manner such that the output error voltage $e_1$ corresponds to the deviation of the elevator from that commanded by the pitch control signal. Trim control for the elevator surface is realized by a secondary servo arrangement responsive to the elevator servo amplifier error voltage $e_1$ to introduce trim sufficient to reduce the loading on the elevator primary servo to zero in a conventional manner.

In the embodiment of FIGURE 1 a dual trim arrangement is provided with independent and separate control of clockwise and counterclockwise control. The clockwise and counterclockwise channels are polarity sensitive as concerns the error signal $e_1$, but otherwise are identical in design. Each comprises a turbulence filter 13 through which the elevator amplifier output signal $e_1$ which is applied to an amplifier 14. The output of amplifier 14 is applied through an electronic switch to an output terminal 16, which is in turn connected to the trim servo clutch. The output 16 is carried through a feedback logic network 17 as a second input 18 to the amplifier 14. The necessity for clockwise or counterclockwise trim effort is conventionally determined by the polarity of the elevator control signal $e_1$. Thus, in the embodiment of FIGURE 1, each of the trim coupler channels is selectively responsive to a given polarity of the elevator control signal $e_1$.

The development of the pulse trains for effecting operation of the trim servo clutch will be described with respect to FIGURE 2, which schematically illustrates an embodiment of each of the clockwise and counterclockwise channels shown in FIGURE 1.

The circuitry of FIGURE 2 functions as a clutch coupler circuit which produces output pulses to activate a magnetic clutch. The clutch, in conjunction with a motor (not illustrated) operates to control the positioned element (not shown), which effects trim. In general the circuit functions as a time controlled latching relay to engage a trim clutch whenever trim error reaches a threshold trim level. The circuitry is thus inactive for input signals below the threshold level. The duration and time occurrence of clutch engagement is determined by circuit adjustments and by the magnitude of the error signal.

With reference to FIGURE 2, an error signal $e_1$, proportional to mis-trim, is applied to a direct current voltage amplifier such as magnetic amplifier 14 through a turbulence filter comprised of resistors 18 and 19 and capacitor 20. The signal is applied to a first control winding 21 of magnetic amplifier 14. Magnetic amplifier 14 includes a second independent control winding 22 to which the logic feedback signal is applied. An amplifier which might be utilized is shown in copending application Serial Number 818,496, entitled, "Automatic Pilot Control Equipment," by Henry W. Patton, assigned to the assignee of the present invention. Additional control windings may be added as needed. The output 25 of magnetic amplifier 14 is applied to zener diode 26 and through resistor 29 to the base 33 of a transistor 31, the latter functioning as the electronic switch 15. A bias source is applied through resistor 30 to the base of transistor 31 such that the transistor is cut off in the absence of a signal from amplifier 14 being applied between the base 33 and emitter 34. A D.C. voltage source of 28 volts is connected to the collector 32 of transistor 31 and essentially appears on the emitter 34 when transistor 31 is conductive. The output terminal 16 connects to the winding 37 of a magnetic clutch, which when energized positions the controlled element to reduce the input error signal $e_1$. A unidirectional positive feedback circuit as concerns amplifier 14 is connected from the anode of zener diode 26 through diode 27 and resistor 28 to a further amplifier input control winding 38. A unidirectional negative feedback circuit is connected between the output terminal 16 of the electronic switch 15 to another control winding 22 of the amplifier 14. This negative feedback logic circuitry consists generally of a capacitor 44 with controlled charging and discharging time constant arrangements such that the negative feedback signal developed in control winding 22 increases exponentially with time at the instant an output signal is present on terminal 16, and decreases exponentially with time when an output signal is removed from output terminal 16.

The output 25 of amplifier 14 is of a magnitude proportional to the net ampere-turns developed in the control windings 21, 22, and 38 which in turn are respectively proportional to the magnitude of the input error signal $e_1$ and the magnitude of the negative and positive feedback signals.

In operation the error signal $e_1$ proportional to mis-trim (primary servo effort) is applied to control winding 21 of amplifier 14. Assuming $e_1$ is of a polarity negative with respect to resistor 18, and that the relative winding of control winding 21 is such that the amplifier develops a negative output 25, no further action of interest occurs since the operation of the circuit depends on activating the electronic switch by causing conduction of transistor 31. An input signal $e_1$ positive with respect to resistor 18 then causes an amplifier output which is positive at terminal 25. This positive output signal occurs after a time delay which is adjustable by input resistor 19. When the positive output signal at terminal 25 reaches a predetermined magnitude determined by the zener diode 26, it conducts. As zener diode 26 conducts, the positive feedback signal is taken through diode 27 and resistor 28 through the amplifier control winding 38 and causes the positive output signal amplitude to increase rapidly to full output. The amplifier output signal is applied between the base 33 and emitter 34 of transistor 31 and causes transistor 31 to fully conduct and apply 28 volts to the output terminal 16. This output $e_0$ is applied to the trim servo clutch 37 and causes the trim system to run and effect re-trimming of the aircraft to reduce the input error signal $e_1$ towards zero.

Simultaneously with the presence of 28 volts at the output terminal 16, the output signal $e_0$ is applied to diodes 40 and 41 in the negative feedback loop and capacitor 44 charges through diode 40 and resistor 42 to apply a negative feedback signal through resistor 45 and diode 46 to the second input control winding 22 of the amplifier. When capacitor 44 charges to a high enough level, the negative feedback signal applied to winding 22 reduces the amplifier output (in spite of the magnitude of $e_1$ and the positive feedback through diode 27) and the amplifier output 25 drops below the threshold voltage of zener diode 26. As zener diode 26 ceases conduction, transistor 31 is again cut off and the output $e_0$ on terminal 16 becomes zero. When $e_0$ falls to zero, capacitor 44 discharges through diodes 46 and 41 causing an exponential decay toward zero. The negative feedback signal is thus exponentially applied at the instant 28 volts is present at output terminal 16 and is exponentially reduced towards zero when 28 volts is removed from output terminal 16. These two actions respectively define the width of the output pulses $e_0$ and determine the time between output pulses $e_0$. It is to be realized that the presence of 28 volts at output terminal 16 energizes the trim clutch 37 which effects a reduction of the trim error signal $e_1$ for the duration of clutch engagement. Thus, during the charging of capacitor 44 in the negative feedback loop, the magnitude of which capacitor 44 charges is that magnitude which effects sufficient negative feedback to cut off amplifier 14 as determined by the differential effect of combining the error signal $e_1$, the negative feedback signal 18, and the positive feedback signal. Thus, the time duration of the output signal, once input threshold is exceeded, is determined by the charging time constant in the feedback loop and may be adjusted by resistor 42. Now the trim action resulting when $e_0$ was 28 volts reduces the error signal $e_1$, and if $e_1$ is reduced low enough, no further action results. If the "on" time of the output pulse $e_0$ is not sufficient to reduce $e_1$ below threshold, the cycle repeats after a predetermined time delay. The time delay is established by the discharge time constant for the capacitor 44 and the resulting differential combination of the reduced error input signal $e_1$ and the decaying negative feedback signal 18, and thus may be adjusted by resistor 43.

The operational aspects may better be understood with consideration of the operational waveforms in FIGURES 4 and 5. First, consider an "open loop" situation wherein the engagement of the clutch 37 does not effect a reduction of the error input signal, as illustrated in FIGURE 4. The lower waveform of FIGURE 4 illustrates a threshold error level sufficient to develop an output from amplifier 14 in excess of the zener diode threshold and assumes an input signal $e_1$ which is in excess of the threshold error. Initial application of this steady state error voltage $e_1$ causes the output signal $e_0$ to rise rapidly to 28 volts. Immediately, capacitor 44 charges towards this 28 volt level to a magnitude at which the negative feedback introduced thereby is sufficient to cut off amplifier 14 in spite of the level of the error signal $e_1$ and the positive feedback signal. At cut-off threshold, transistor 31 ceases to conduct, the output voltage $e_0$ falls to zero, and the voltage $Vc$ on capacitor 44 decays towards the zero level. As the capacitor voltage $Vc$ reduces to the "on" threshold level, the magnitude of the error voltage $e_1$ is sufficient to overcome the negative feedback as determined by $Vc$ and again the amplifier goes into full conduction to trigger the transistor into conduction such that the output signal $e_0$ again rises to 28 volts. The sequence is repeated on a periodic basis with the "on" time of the output signal $e_0$ being determined by the charging time constant of capacitor 44. The time between successive $e_0$ pulses is determined by the time for $Vc$ to decay to the "on" threshold level. FIGURE 3 illustrates a typical range in variation of outputs which may thus be preselected for an open loop situation. In this open loop consideration, the on and off times of the output pulses $e_0$ for a given magnitude of input error signal $e_1$ are seen to be respectively determined by the charging and discharging time constants as concerns capacitor 44 in the negative feedback loop. Further consideration of the operation for "closed" loop operation will indicate that the "on" and "off" times, as determined by adjustment of the charging and discharging time constants in the negative feedback loop correspond to a maximum "on" time and minimum "off" time.

With closed loop reduction of the input error signal $e_1$ during each "on" time period of the output signal $e_0$, the output $e_0$ as illustrated in FIGURE 5 is comprised of a train of pulses with successively decreased pulse widths and with successive increased time separation. The proportional control aspect of this circuitry will thus be seen with respect to the operating characteristics illustrated in the closed loop situation of FIGURE 5.

The output waveform $e_0$ during closed loop operation is similar in general to that of the open loop with the exception that the "cut off" and "on" thresholds previously described are no longer fixed since they are defined in terms o fthe net or differential ampere-turns resulting from the simultaneous application of the error signal and positive feedback signal to negative feedback signals to the second control winding of the amplifier. With reference to FIGURE 5 let it be assumed that at time $t_0$ an initial input error $e_1$ of a level in excess of the threshold error is applied to control winding 21 of the amplifier. As above described, amplifier 14 goes into full conduction and transistor 31 switches 28 volts to output terminal 16. Capacitor 44 in the negative feedback loop again charges towards the 28 volt level to the cut-off threshold determined by the differential effect of combining $Vc$ with $e_1$ at the amplifier input. Capacitor 44 thus charges to a $Vc$ value which cancels the positive feedback signal removing the positive output voltage from the amplifier. This also removes the positive feedback signal so that the remaining ampere turns in the amplifier are determined by the capacitor voltage and the error signal $e_1$ (which is simultaneously being reduced by clutch action). Capacitor 44 then discharges as previously described, but in this instance, due to the reduced level of the error signal $e_1$ during the preceeding $e_0$ "on-time," discharges for a longer period of time to that point at which the error signal $e_1$ is of sufficient magnitude to overcome the negative feedback signal $Vc$ and cause the cycle to repeat.

As the cycle repeats the output signal $e_0$ goes to 28 volts and the capacitor charges towards a new cut-off threshold which is less than the preceeding one since the error voltage $e_1$ is simultaneously being reduced and, in effect, less negative feedback is required to effect cut-off of the amplifier. A continuation of this situation is illustrated in which each succeeding cut off threshold $a$, $a_1$, $a_2$, $a_3$ . . . is less than the preceeding one, and in which each succeeding "on" threshold level $b$, $b_1$, $b_2$ . . . is less than the previous one due to the successive reduction in the input error signal $e_1$ during each output pulse interval.

It should be emphasized that the output signal $e_0$ has been described as being a series of pulses with varying width and separation, the effects of which cumulatively combine to reduce the output duty cycle in a proportional manner. It is to be understood that the reduction of the error signal during any one of the output "pulses," including the first pulse, may be sufficient to fall beneath the threshold error level. Thus, depending upon the magnitude of the error signal, the output may be but a single pulse with duration sufficient only to reduce the error beneath threshold: the output may be a single pulse of the maximum duration determined by the setting of the "on" time resistor followed by a single narrower pulse, the duration of which is sufficient to reduce the error beneath threshold. Further, assuming the error signal to be one resulting from a large trim error condition, the output might be a series of one or more maximum-width pulses with the predetermined minimum spacing between pulses followed at such a time that the clutching effort has been sufficient to begin a reduction in the error signal $e_1$ during the "on" intervals by a series of successively shorter pulses with successively greater time intervals therebetween.

The control circuitry of the present invention is thus seen to provide a decided exacting proportionality and a degree of flexibility by which adaptation may be made for various servo applications. Provision is included to independently adjust the "open loop" on and off times over a range of several seconds such that the output duty cycle may be selected in terms of on and off clutch engagement periods for optimum responsiveness for a given application with assurance that a sufficient minimum interval between clutch engagements will obviate clutch chattering.

The certain illustrated embodiments are by way of example only and not to be considered in a limiting sense. For example, the amplifier 14 is illustrated as a magnetic amplifier embodiment utilizing independent control windings for the necessary differential action between input and feedback signals. It is to be considered within the scope of the present invention that the amplifier may be of other direct current voltage types and include known expedients for developing a differential combination of input and feedback signals. It is considered that other amplifiers employing feedback techniques might be utilized to provide the latching type of operation as a function of the error signal level and the negative feedback signal level in a differential manner. Further, while the independent polarity responsiveness of each of the clockwise and counterclockwise channels in the embodiment of FIGURE 1 may be obtained by appropriate polarization of the input signal as applied to the respective channel amplifiers, other expedients such as appropriately polarized diodes placed in the signal paths to each of the channels might be utilized as well.

Thus, although the invention has been described with respect to the particular embodiment thereof, it is not to be so limited, as changes might be made therein within the scope of the present invention as defined by the appended claims.

We claim:

1. In a servo positioning system including a source of error voltage indicative of the extent of deviation of a controlled member from a commanded position, control means for restoring said control member to said commanded position comprising an amplifier receiving said error signal, threshold sensing means connected to the output of said amplifier, positive feedback means connected between the output of said threshold sensing means and the input to said amplifier, electronic switching means connected to the output of said threshold sensing means, said electronic switching means including a source of direct current voltage and being responsive to an output from said threshold sensing means to connect said direct current voltage source to an output terminal, positioning means connected to said output terminal and responsive to the presence of said D.C. voltage thereon to position said control means toward said commanded position, negative feedback means connected between said output terminal and the input of said amplifier, said negative feedback means including delay means through which said D.C. voltage on said output terminal is applied to the input of said amplifier, said D.C. voltage having a magnitude sufficient to reduce the output of said amplifier beneath said predetermined threshold, said negative feedback means including further means by which said negative feedback voltage is reduced in a time controlled manner upon said amplifier output signal falling beneath said predetermined magnitude whereby said input signal and said negative feedback signal differentially combine to produce an amplifier output signal in the form of sequential pulses, the duration of which and rate of development of which are each proportional to said error voltage, said sequence of pulses being developed until said error input signal is reduced to that level corresponding to an amplifier output signal beneath said predetermined amplitude.

2. A servo control circuit for positioning a controlled member in response to deviation from a command position comprising a source of deviation signal indicative of the extent of deviation of said member from said commanded position, amplifying means including an input circuit to which said error signal is applied, positive feedback means connected between the output of said amplifier and said amplifier input circuit, said positive feedback means operative in response to said amplifier output exceeding a predetermined threshold to effect saturation of said amplifier, electronic switching means, a source of D.C. voltage having a magnitude exceeding the maximum amplitude of said error signal, an output terminal, said electronic switching means receiving said amplifier output and being responsive to an amplifier output signal in excess of said predetermined magnitude to effect connection of said direct current voltage source to said output terminal, negative feedback means connected between said output terminal and said amplifier input circuit, said amplifier input circuit including means to differentially combine said error and feedback signals applied thereto, said negative feedback means including means to exponentially apply the voltage on said output terminal to said amplifier input circuit to effect amplifier cut off a predetermined time after the saturation thereof, said negative feedback means including further means responsive to the cut off of said amplifier to exponentially reduce the negative feedback voltage applied to said amplifier input circuit upon said amplifier being cut off, said negative feedback reduction being effected until said input error signal differentially overcomes said negative feedback voltage sufficiently to produce an amplifier output in excess of said predetermined magnitude, and control means responsive to the presence of said direct current voltage at said output terminal to position said controlled member for sequential step reduction of said error signal input.

3. A servo control circuit for positioning a controlled member in response to deviation from a command position comprising a source of deviation signal indicative of the extent of deviation of said member from said commanded position, amplifying means, voltage threshold sensing means receiving said amplifier output, electronic switching means connected to said threshold sensing means, said electronic switching means comprising a source of direct current voltage and means responsive to an output from said threshold sensing means to connect said direct current voltage source to an output terminal, a positive feedback means connected between the output of said threshold sensing means and said amplifier input, negative feedback means connected between said output terminal and the input of said amplifier, said amplifier being adapted to provide an output signal proportional to the differential of said input and feedback signals applied thereto, said negative feedback including voltage control means initiated in response to said direct current voltage signal being connected to said output terminal to apply negative feedback to said amplifier in a time controlled increasing manner to effect reduction of said amplifier output beneath said predetermined threshold and subsequent removal of said direct current voltage source from said output terminal, said negative feedback means further including voltage control means by which said negative feedback signal is reduced in a time controlled manner, said reduction being initiated upon said amplifier output falling beneath said predetermined manitude, said reduction being effected to a signal level insufficient to maintain said amplifier output beneath said predetermined magnitude in response to the magnitude of said error input signal, controlling means connected to said output terminal and responsive to the presence of said D.C. voltage source thereon to correctively position said controlled member for reduction of said error signal, the said corrective positioning being effected during sequential intervals, the duration of said intervals successively decreasing with reduction in said error signal and the time between successive intervals successively increasing with reduction of said error signal, said control being effected until the output of said amplifier in response to said error signal is less than said predetermined threshold.

4. A servo control circuit for positioning a controlled member in response to deviation from a preselected position, comprising a source of deviation signal indicative of the deviation of said member from a predefined position, an amplifier having input and output means, means connecting said deviation signal to the input means of said amplifier, electronic switching means receiving the output of said amplifier, positive feedback means connecting the output of said amplifier to the input means thereof, said electronic switching means including a source of D.C. voltage exceeding that of the maximum error input signal, said electronic switching means being responsive to an amplifier output signal of predetermined magnitude to connect said D.C. source to an output terminal, positioning means connected to said output terminal and energized in response to the presence of said voltage source on said terminal, negative feedback means connected between said output terminal and the input of said amplifier responsive to said output voltage; said negative feedback means including means for reducing said amplifier output signal below said predetermined output level after a predetermined time delay and means responsive to said amplifier output falling beneath said predetermined level to reduce said negative feedback signal to zero in a time controlled manner; control means responsive to said positioning means being energized to reduce said error input signal to zero, said output signal being in the form of pulses, the duration and periodicity of said pulses being a function of the differential combination of said amplifier input, positive, and negative feedback signals.

5. Means for developing a train of pulses to effect time controlled movement of a controlled member in response to a deviation error signal proportional to the displacement of said controlled member from a commanded position, said pulses having a predetermined maximum width and predetermined minimum delay between successive ones as determined by the maximum amplitude of said error signal, said means including voltage control means whereby said pulses are generated with the pulse widths of successive ones being directly proportional to said error signal and with delay between successive ones being inversely proportional to said error signal comprising an amplifier receiving said error signal, positive feedback means responsive to an amplifier output in excess of a predetermined threshold to effect saturation of said amplifier, negative feedback means responsive to said amplifier output to apply time increasing negative feedback signal to said amplifier, said negative feedback means including a capacitor and means for connecting thereto a charging voltage source towards which said capacitor charges upon said amplifier output exceeding said predetermined threshold, said negative feedback means further including a discharge means for said capacitor through which said capacitor discharges upon said amplifier output falling beneath said predetermined threshold in response to a predetermined charge on said capacitor, means for differentially combining said input error signal and feedback signals before amplification of the combination thereof by said amplifier, means connecting said pulses to an output terminal, the duration of said pulses being determined by the magnitude of said error signal and the time constant of said capacitor charging path and the time between successive ones of said pulses being determined by the magnitude of said error signal and the time constant of said capacitor discharging path and control means connected to said output terminal and responsive to said pulses to proportionally position said controlled member to effect sequential and proportional reduction of said error signal.

6. A system, as defined in claim 5 wherein each of said capacitor charging and discharging paths includes a variable resistance member by which said predetermined maximum pulse width and minimum delay between successive ones of said pulses may be selectively effected.

7. A system, as defined in claim 4 wherein said negative feedback means comprises a first unilateral conduction device, a first resistance member and a second unilateral conduction device respectively serially connected between said output terminal and the input means of said amplifier, said first and second unilateral conduction device being like-polarized to pass said output signal, a third oppositely-polarized unilateral conduction device and a second resistive member respectively serially connected between said output terminals and the junction of said first resistive member and second unilateral conduction device, said output terminal and said amplifier input having a common return reference, and a capacitor connected between the junction of said first and second resistive members and said common return reference, said unilateral conduction devices being so polarized with respect to said output voltage to sequentially effect charging of said capacitor to said output voltage through said first resistive means and discharging of said capacitor through each of said second resistive means, and said second unilateral conduction device.

8. A system as defined in claim 7 wherein each of said resistive means is selectively adjustable, said error signal having a predetermined maximum amplitude in response to which the adjustment of said first resistive means establishes a capacitor charging time constant by which a selected maximum duration of said output voltage pulses is determined and the adjustment of said second resistive member establishes a discharging time constant for said capacitor by which a selected minimum delay between successive ones of said output pulses is determined.

References Cited in the file of this patent
UNITED STATES PATENTS
3,083,327    Bylott _____ Mar. 26, 1963